US010248795B2

(12) United States Patent
Lu et al.

(10) Patent No.: US 10,248,795 B2
(45) Date of Patent: Apr. 2, 2019

(54) IMPLEMENTING METHOD FOR JAVACARD APPLICATION FUNCTION EXPANSION (71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 220 days.

(21) Appl. No.: 15/358,039

(22) Filed: Nov. 21, 2016

(65) Prior Publication Data
US 2017/0124339 A1 May 4, 2017

Related U.S. Application Data (63) Continuation of application No. PCT/CN2015/081834, filed on Jun. 18, 2015.

(30) Foreign Application Priority Data

Jun. 24, 2014 (CN) .......................... 2014 1 0286117

(51) Int. Cl.
G06F 7/58 (2006.01)
G06F 21/51 (2013.01)
(Continued)

(52) U.S. Cl.
CPC ............ G06F 21/602 (2013.01); G06F 7/588 (2013.01); G06F 9/44526 (2013.01); G06F 21/51 (2013.01)

(58) Field of Classification Search
None
See application file for complete search history.

(56) References Cited

U.S. PATENT DOCUMENTS

2008/0034423 A1* 2/2008 Durix ...................... G06F 21/51
726/20

FOREIGN PATENT DOCUMENTS

CN 101533481 A 9/2009
CN 102063634 A 5/2011
(Continued)

OTHER PUBLICATIONS

International Search Report of corresponding International PCT Application No. PCT/CN2015/081834, dated Aug. 26, 2015.

Primary Examiner — Madhuri R Herzog
(74) Attorney, Agent, or Firm — J.C. Patents (57) ABSTRACT An implementing method for JavaCard application function expansion is provided, where a registering process includes: an expansion application processes a random number when receiving a registration command and sends a processing result, an expansion application identification and an expansion interface number to a master application; the master application verifies the process result, if verification is successful and an expansion application corresponding to the expansion application identification is installed, the master application sets a bit of an expansion point upon the expansion interface number, obtains and stores a handle of the expansion application; a state of an expansion interface registered by the expansion application is stored in the buffer. In solutions provided by the present invention, the expansion interface corresponding to the expansion application is registered to the master application; when needing to invoke the expansion application, the master application can invoke corresponding expansion application via the registered expansion interface.

19 Claims, 5 Drawing Sheets (51) Int. Cl.
*G06F 21/60* (2013.01)
*G06F 9/445* (2018.01)

(56) References Cited

FOREIGN PATENT DOCUMENTS

| | | | | |
|---|---|---|---|---|
| CN | 103632185 | A | 3/2014 | |
| CN | 103677909 | A | 3/2014 | |
| CN | 104102507 | A | 10/2014 | |
| EP | 0949595 | A2 * | 10/1999 | ........... G06Q 20/341 |
| KR | 2009-0014810 | A | 2/2009 | |

\* cited by examiner

IMPLEMENTING METHOD FOR JAVACARD APPLICATION FUNCTION EXPANSION

CROSS-REFERENCE TO RELATED APPLICATIONS

This application is a continuation of International Application No. PCT/CN2015/081834, filed on Jun. 18, 2015, which claims priority to Chinese Patent Application No. 201410286117.0, filed on Jun. 24, 2014, both of which are hereby incorporated by reference in their entireties.

FIELD OF THE INVENTION

The present invention relates to JavaCard application technology, particularly to an implementing method for JavaCard application function expansion.

BACKGROUND OF THE INVENTION

A storage system of smart card is mainly made up of Random-Access Memory (RAM), Read-Only Memory (RAM) and Electrically Erasable Programmable Read-Only Memory (EEPROM). Java Card is a smart card which can execute Java program code. Applications stored in EEPROM of the Java card can perform operations such as downloading, installing and deleting by GlobalPlatform standard instruction (GP instruction). Masked application is an application stored in ROM, which cannot be deleted; non-masked application is an application stored in flash and e2p.

In the prior art, in the case that function defection or error is found in an original application during use of a Java Card, problems like that can be solved by deleting the original application, downloading and installing a new application, which may lead to data loss of users in using process. If size of the application on Java Card is big and the size of modified content is small, the whole application program requires to be re-downloaded, installed and personalized after being modified, which wastes time. For a masked Java Card, codes cannot be deleted after the codes being written in ROM. If defection exists, the whole application cannot be used. Similarly, in process of developing Chip Operating System (COS), either card management module, Java Card Runtime Environment (JCRE) module or Java Card Virtual Machine (JCVM) module, which is implemented using Java language, may have defection. Once masking is completed, program cannot be modified.

SUMMARY OF THE INVENTION

In order to overcome defection in the prior art, the present invention provides an implementing method for JavaCard application function expansion.

The present invention provides an implementing method for JavaCard application function expansion, including a registering process and an invoking process, an expansion application and a master application starting working after being activated, where the registering process includes:

Step S1, obtaining, by the expansion application, a random number generated by the master application when the expansion application receives a registration command dispatched by runtime environment;

Step S2, processing, by the expansion application, the random number and sending a processing result, and an expansion application identification and an expansion interface number in the registration command to the master application;

Step S3, verifying, by the master application, the received processing result upon the generated random number, if the verification is successful, executing Step S4, otherwise, reporting error and ending procedure;

Step S4, determining, by the master application, whether a corresponding expansion application is installed, upon the received expansion application identification, if yes, executing Step S5, otherwise, reporting error and ending the procedure;

Step S5, setting, by the master application, a bit of a corresponding expansion point in a buffer of the master application upon the expansion interface number, obtaining and storing a handle of the expansion application and returning information of successful association to the expansion application;

Step S6, registering, by the expansion application, a state of the expansion interface and storing the state of the expansion interface in the buffer of the master application;

the invoking process includes:

Step S7, starting, by the master application, running an original program when the master application receives a function command dispatched by the runtime environment;

Step S8, determining, by the master application, whether the bit of the corresponding expansion point in the buffer is set, if yes, executing Step S9, otherwise, keeping on executing the original program and going back to Step S8;

Step S9, determining, by the master application, whether the corresponding expansion interface is available upon the state of the expansion interface corresponding to the expansion interface which corresponds to the expansion point in the buffer, if yes, executing Step S10, otherwise, keeping on executing the original program and going back to Step S8

Step S10, invoking, by the master application, the corresponding expansion application upon the stored handle of the expansion application; invoking, by the expansion application, the expansion interface corresponding to the expansion interface number;

Step S11, determining, by the master application, whether to keep on executing the original program, upon a returned result obtained by invoking the expansion interface corresponding to the expansion interface number by the expansion application, if yes, keeping on executing the original program and going back to Step S8, otherwise, returning executing result and information back to the runtime environment and ending the procedure.

Further, before Step S1, the method further includes:

when the expansion application receives an authentication command dispatched by the runtime environment, executing Step A1 to Step A4;

Step A1, determining, by the expansion application, whether a security channel instance is instantiated, if yes, executing Step A3, otherwise, executing Step A2;

Step A2, obtaining, by the expansion application, the security channel instance, and storing same in non-volatile buffer, executing Step A3;

Step A3, obtaining, by the expansion application, upon the authentication command, data length which is sent out of a card, obtaining corresponding data of the data length in a returned result of executing the authentication command by the security domain and storing the data in apdu buffer;

Step A4, sending, by the expansion application, result data out of the card by invoking a communication interface, and setting a security level and waiting for receiving a command.

Further, Step A3 includes:

Step A3-1, determining, by the expansion application, a type of the authentication command, executing Step A3-2 if the type is a first authentication command and executing Step A3-3 if the type is a second authentication command;

Step A3-2, obtaining, by the expansion application, the data length sent out of the card upon the first authentication command, obtaining, upon the data length, data of corresponding length from a returned result of executing the first authentication command by the security domain, and storing the data in the apdu buffer, executing Step A4;

Step A3-3, obtaining, by the expansion application, upon the second authentication command, the data length, which is 00, required to be sent out of the card, executing Step A4.

Further, if the authentication command is the first authentication command, Step A4 includes: invoking, by the expansion application, the communication interface to send the data in the apdu buffer out of the card, setting a value of the security level as 00;

if the authentication command is the second authentication command, Step A4 includes: invoking, by the expansion application, the communication interface to send correct information out of the card, setting the value of the security level as non-00.

Further, before obtaining, by the master application, the generated random number in Step S1, the method further includes:

obtaining, by the expansion application, the security level and determining whether the security level meets a condition, if yes, obtaining the random number generated by the master application, otherwise, invoking the communication interface to send information that security condition is not met out of the card and waiting for receiving a command.

Further, determining whether the security level meets a condition specifically includes:

obtaining a value of the security level by invoking a first interface function, determining whether the obtained value is 00, if yes, the security level does not meet the condition, otherwise, the security level meets the condition.

Further, before Step S1, the method further includes:

Step B, when the expansion application receives a selection command, invoking the communication interface to send file controlling information out of the card, and waiting for receiving a command.

Further, before Step B the method further includes:

executing Step P1 when the runtime environment receives an APDU command;

Step P1, determining, by the runtime environment, whether the received APDU command is the selection command, if yes, executing Step P2, otherwise, executing Step P4;

Step P2, searching for, by the runtime environment, a corresponding application in an application table of the JavaCard upon an application identification in the selection command, and determining whether the corresponding application is found, if yes, executing Step P3, otherwise, executing Step P4;

Step P3, obtaining, by the runtime environment, an application handle corresponding to the application identification from the found application, invoking a deselect( ) interface of a current activated application, invoking a select function of the corresponding application upon the application handle corresponding to the application identification; if the select function is executed correctly, setting the application corresponding to the application identification as the current activated application, executing Step P4; if the select function is not executed correctly, capturing, by the runtime environment, exception, executing Step P4 after completing exception process;

Step P4, dispatching, by the runtime environment, the received APDU command to the current activated application.

Further, Step S2 includes: encrypting, by the expansion application, the obtained random number with a stored key, sending an encrypting result, the expansion application identification and the expansion interface number in the registration command to the master application;

Step S3 includes: decrypting, by the master application, the received encrypting result with the stored key, if the decrypting is successful, determining whether a random number obtained by decrypting is identical to the generated random number, if yes, executing Step S4, otherwise, returning error information to the expansion application; if the decrypting is failed, returning error information to the expansion application.

Further, Step S2 includes: signing, by the expansion application, the obtained random number with a stored private key, sending a signing result, the expansion application identification and the expansion interface number in the registration command to the master application;

Step S3 includes: decrypting, by the master application, the received signing result with a stored public key, if the decrypting is successful, performing Hash operation on the generated random number, determining whether a hash result is identical to a decrypting result, if yes, executing Step S4, otherwise, returning error information; if the decrypting is failed, returning error information to the expansion application.

Further, between Step S5 and Step S6, the method further includes:

determining, by the expansion application, whether association is successful upon information returned by the master application, if yes, executing Step S6, otherwise, invoking the communication interface to send error information out of the card and ending the procedure.

Further, after Step S6, the method includes:

determining, by the expansion application, whether storing is successful, if yes, invoking the communication interface to send information of successful registration out of the card and waiting for receiving an instruction, otherwise, capturing, by the runtime environment, exception, and ending the procedure after completing exception process.

Further, before Step S6, the method further includes:

Step S6-1, determining, by the expansion application, whether the corresponding expansion interface is registered, upon a data field in the registration command, if yes, invoking the communication interface to send error information out of the card and ending the procedure, otherwise, executing Step S6.

Further, Step S6 includes: invoking, by the expansion application, a third function of the master application, inputting the expansion interface number and the state of the expansion interface; after detecting that the third function is invoked, checking, by the master application, whether an expansion point corresponding to the expansion interface number exists, if yes, modifying a state of the expansion point upon the state of the expansion interface, returning correct information back to the expansion application and going back to Step S1, otherwise, returning error information back to the expansion application and ending the procedure.

Further, Step S6 is replaced with a step of determining, by the expansion application, whether the registration command is legitimate, if yes, waiting for receiving a command, otherwise, invoking the communication interface to send error information out of the card and ending the procedure;

the method further includes: executing Step D1 when the expansion application receives an association command;

Step D1, determining, by the expansion application, upon a data field in the association command, whether a corresponding expansion interface is registered, if yes, invoking the communication interface to send error information out of the card and ending the procedure; otherwise, executing Step D2;

Step D2, invoking, by the expansion application, the third function of the master application, inputting the expansion interface number and the state of the expansion interface; after detecting, by the master application, that the third function is invoked, checking whether an expansion point corresponding to the expansion interface number exists, if yes, modifying a state of the expansion point upon the state of the expansion interface, returning correct information back to the expansion application and waiting for receiving a command, otherwise, returning error information back to the expansion application and ending the procedure.

Further, modifying the state of the expansion point upon the state of the expansion interface specifically includes: setting the state of the expansion point to be an active state;

Step S9 specifically includes: determining, by the master application, whether the state of the expansion point is the active state, if yes, the corresponding expansion interface is available; otherwise, the corresponding expansion interface is not available.

Further, obtaining and storing the handle of the expansion application in Step S5 includes: obtaining and storing, by the master application, the handle of the expansion application by invoking a first standard interface via the expansion application identification and a preset parameter.

Further, obtaining and storing, by the master application, the handle of the expansion application by invoking a first standard interface specifically includes:

Step L1, searching for, by the runtime environment, whether there is a corresponding application in an application table upon the expansion application identification, if yes, executing Step L2; otherwise, returning error information to the master application;

Step L2, determining, by the runtime environment, whether the application corresponding to the expansion application identification is a Shareable type application, if yes, executing Step L3; otherwise, returning error information to the master application;

Step L3, invoking, by the runtime environment, a second standard interface of the expansion application upon the application handle stored in the application table and the preset parameter;

Step L4, when the second standard interface of the expansion application is invoked, checking, by the expansion application, whether a previous application invoking the second standard interface meets a preset requirement, if yes, executing Step L5, otherwise, returning error information to the runtime environment;

Step L5, determining, by the expansion application, whether a value of the preset parameter is 0, if yes, returning the handle of the expansion application to the runtime environment and executing Step L6, otherwise, returning error information to the runtime environment;

Step L6, returning, by the runtime environment, the handle of the expansion application to the master application; receiving and storing, by the master application, the handle of the expansion application.

Further, between Step S9 and Step S10, the method includes:

determining, by the master application, whether the expansion application corresponding to the expansion application identification is the Shareable type application, if yes, executing Step S10, otherwise, keeping on executing the original program and going back to Step S7.

In the implementing method for JavaCard application function expansion provided by the present invention, the expansion interface corresponding to the expansion application is registered to the master application. Therefore, when the master application requires invoking the expansion application in executing process, a solution of invoking the corresponding expansion application via the registered expansion interface can provide an implementing method for updating application program after masking, which avoids losing personalized data of a user. After error happens on a masked application, the method can be kept on being used, which is suitable for masked cards and non-masked cards

DETAILED DESCRIPTION OF THE INVENTION

The technical solutions of the embodiments of the disclosure are described clearly and completely in conjunction with the accompanying drawings in the embodiments of the disclosure as follows. Apparently, the described embodiments are merely a part of but not all of the embodiments according to the disclosure. Based on the described embodiments of the disclosure, other embodiments obtained by those of ordinary skill in the art without any creative work belong to the scope of the disclosure.

Embodiment 1

Figure 1:
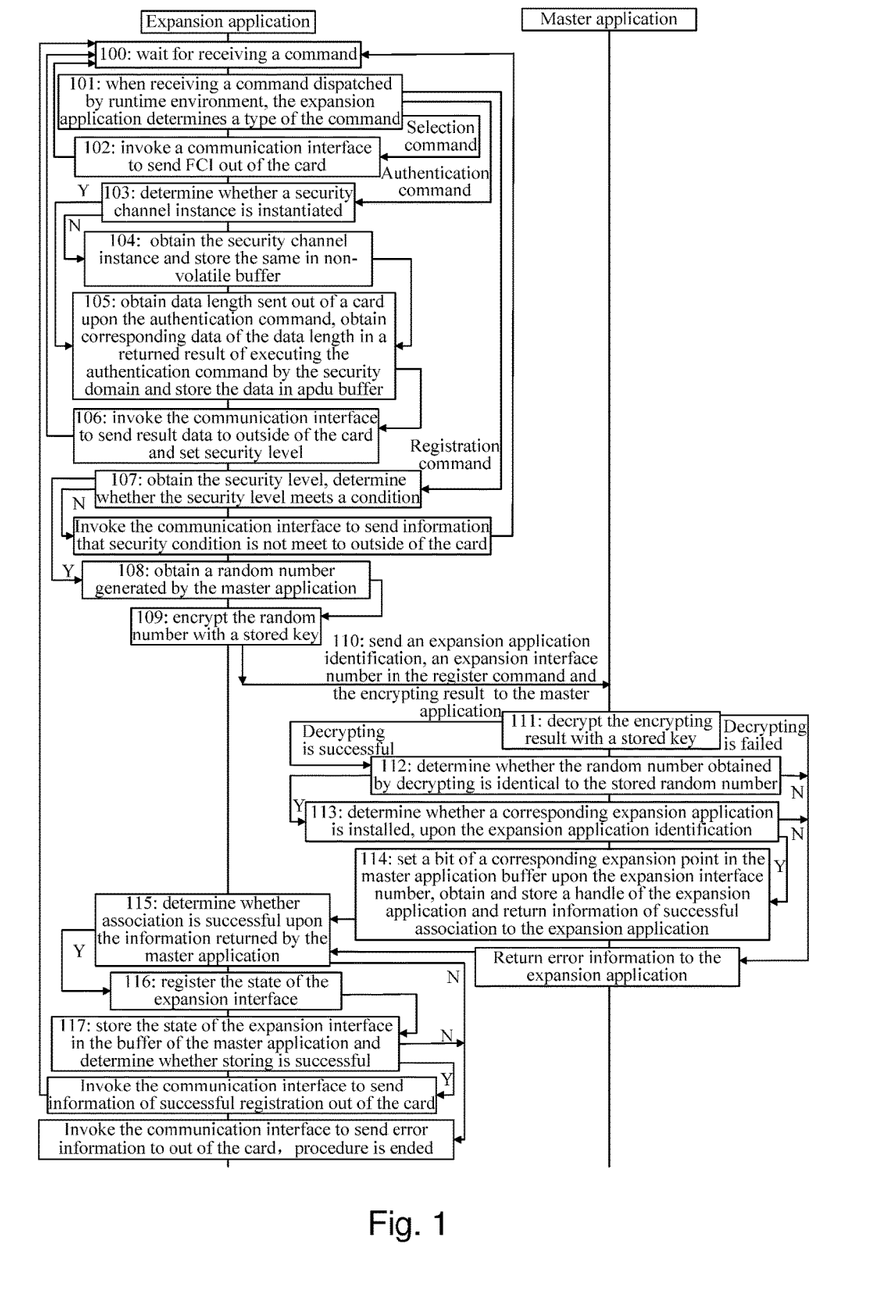
FIG. 1 and FIG. 2 present a flow diagram of an implementing method for JavaCard application function expansion.

Embodiment 1 of the present invention provides an implementing method for JavaCard application function expansion, which includes a registering process and an invoking process; an expansion application and a master application starts working after being activated. As shown by FIG. 1, the registering process includes following Steps.

Step 100, the expansion application waits for receiving a command.

Step 101, when the expansion application receives a command dispatched by runtime environment, the expansion application determines a type of the command, if the type is selection command, execute Step 102; if the type is authentication command, execute Step 103; if the type is registering command, execute Step 107.

Specifically, in Embodiment 1, the command is in APDU format; determining the type of the command includes that the type is the selection command if INS of the command is 0xA4, the type is the authentication command if CLA and INS of the command are 8482 or 8050, the type is registering command if the INS is 0xC0.

For example, the selection command is 00 A4 04 00; the authentication command is 8050 00 00 08 03af7a7d446a24f6 and 84820000 10 619f9d758006f9b6 c290df14738f005f; the registering command is 00000000 02 0102; in this case, 0102 represents a first expansion interface and a second expansion interface implemented by the expansion application, respectively; the expansion points corresponding to the master application are a first expansion point and a second expansion point, respectively.

Step 102, the expansion application invokes a communication interface to send File Control Information (FCI) out of the card, go back to Step 100.

In the present embodiment, Step 102 specifically includes that the expansion application directly invokes apdu.setOutGoingAndSend( ) interface after completing organizing of FCI information and sends the organized information out of the card.

Specifically, if a data field of the selection command is D0000000000601, it represents that the master application is selected; if the data field of the selection command is D00000000006010, it represents that the expansion application is selected.

Step 103, the expansion application determines whether a security channel instance is instantiated, if yes, execute Step 105, otherwise, execute Step 104.

Step 104, the expansion application obtains the security channel instance and stores the same in non-volatile buffer, execute Step 105.

Specifically, in the present embodiment, the expansion application invokes GPSystem.getSecureChannel( ) to obtain the security channel instance.

Step 105, the expansion application obtains data length which is sent out of a card upon the authentication command, obtains corresponding data of the data length in a returned result of executing the authentication command by the security domain and stores the data in apdu buffer.

In the present embodiment, the expansion application takes the received authentication command as a parameter and obtains the data length which is sent out of a card by that the security channel instance invokes a security channel instance function processSecurity(APDu apdu); implementing processsecurity is completed by the security channel instance; the data and the data length which are required to be sent out of the card are returned after successful executing.

Specifically, in the present embodiment, Step 105 includes:

Step 105-1, the expansion application determines the type of the authentication command, if the type is a first authentication command, execute Step 105-2, and if the type is a second authentication command, execute Step 105-3.

Specifically, in the present embodiment the first authentication command is 8050 00 00 08 03af7a7d446a24f6; the second authentication command is 84820000 10 619f9d758006f9b6 c290df14738f005f.

Step 105-2, the expansion application obtains the data length required to be sent out of the card upon the first authentication command, obtains data of corresponding length from a returned result of executing the first authentication command by the security domain upon the data length and stores the data in the apdu buffer.

Step 105-3, the expansion application obtains the data length, which is 00, required to be sent out of the card upon the second authentication command.

Step 106, the expansion application invokes the communication interface to send result data out of the card and sets a security level; go back to Step 100.

In the present embodiment, in the case of the first authentication command 8050 00 00 08 03af7a7d446a24f6, the data field of the command is host random 03af7a7d446a24f6; then, Step 106 specifically is that the expansion application sends the data in the apdu buffer out of the card and sets a value of the security level to be 00; the data in the apdu buffer is 00007118035454911734 FF02 000C 4081ED9718CD 48257D1BDAA46CAA; data analysis result is as the following: key diversify data: 00007118035454911734; current key version: FF; security channel protocol version: 2; counter: 000c; random number inside card: 4081ed9718cd; cipher text inside card: 48257d1bdaa46caa.

In the case of the second authentication command 84820000 10 619f9d758006f9b6 c290df14738f005f, 619f9d758006f9b6 is cipher text outside of card, and c290df14738f005f is mac data; then Step 106 is specifically that the expansion application returns correct information and sets the value of the security level to be non-00.

Step 107, the expansion application obtains the security level, determines whether the security level meets a condition, if yes, execute Step 108, otherwise, invoke the communication interface and send information that security condition is not met out of the card, go back to Step 100.

Specifically, in the present embodiment, the expansion application obtains the value of the security level by invoking a first interface function, determines whether the obtained value is 00, if yes, the security level does not meet the condition, otherwise the security level meets the condition; the initial value of the security level is 00; specifically, the first interface function is SecureChannel.getSecurityLevel( ).

Step 108, the expansion application obtains a random number generated by the master application.

Specifically, in the present embodiment, the expansion application invokes a first function of the master application; when the master application detects that the first function is invoked, the master application generates and returns the random number; meanwhile, the master application stores the random number for subsequent verification process.

The first function is getRandom( ) for obtaining a random number, which specifically includes that getRandom( ) first invokes RandomData.getInstance(byte algorithm) interface to obtain an instance of randomData, rndInstance; then getRandom( ) invokes generateData(byte[ ] buffer, short offset, short length) interface of rndInstance to obtain the random number.

For example, the random number in the embodiment is 48257d1bdaa46caa.

Step 109, the expansion application encrypts the random number with a stored key.

In the present embodiment, the expansion application has already set the type of the key at the time of personalizing; preferably, the key in the present embodiment is symmetric key, for example, 3DES key: 404142434445464748494A4B4C4D4E4F; an encrypting result is 6719758F25E91945.

Step 110, the expansion application sends an expansion application identification and an expansion interface number in the register command and an encrypting result to the master application;

Specifically, in the present embodiment, the expansion application takes the expansion application identification, the expansion interface number and the encrypting result as parameters to invoke a second function of extendInstall( ) of the master application; the second function is for obtaining a registration expansion application interface; the expansion application decrypts the encrypting result by invoking the second function of the master application.

In the present embodiment, the expansion application identification and the expansion interface number can be in one registration command or different commands.

Step 111, the master application decrypts the encrypting result with a stored key; if decrypting is successful, execute Step 112; if decrypting is failed, return error information to the expansion application, execute Step 115.

In the present embodiment, the key stored in the master application corresponds to the key of the expansion application.

Step 112, the master application determines whether the random number obtained by decrypting is identical to the stored random number, if yes, execute Step 113, otherwise, return error information to the expansion application and execute Step 115.

In the present embodiment, Step 112 is for verifying legitimacy of the expansion application, which prevents a malicious expansion application from destroying execution logic of the master application and avoids unpredictable result.

Step 113, the master application determines whether a corresponding expansion application is installed, upon the expansion application identification; if yes, execute Step 114; otherwise, return error information to the expansion application and execute Step 115.

Specifically, in the present embodiment, the master application invokes JCSystem.lookupAID( byte[ ] buffer, short offset, byte length) upon the expansion application identification; if a returned value is null, it represents that the corresponding expansion application is not installed, error information is returned to the expansion application, execute Step 115; otherwise, execute Step 114.

In the present embodiment, the expansion application has different expansion interfaces, different expansion interfaces correspond to different expansion interface numbers; each expansion interface has a corresponding state.

Step 114, the master application sets a bit of a corresponding expansion point in the master application buffer upon an expansion interface number, obtains and stores a handle of the expansion application and returns information of successful association to the expansion application, execute Step 115.

Specifically, the master application sets the expansion interface number in an original program via a standard interface, which implements association between the expansion interface identification and its corresponding expansion application. A standard interface in the present embodiment is JCSystem. getAppletShareableInterfaceObject(AID serverAID, byte parameter).

Figure 5:
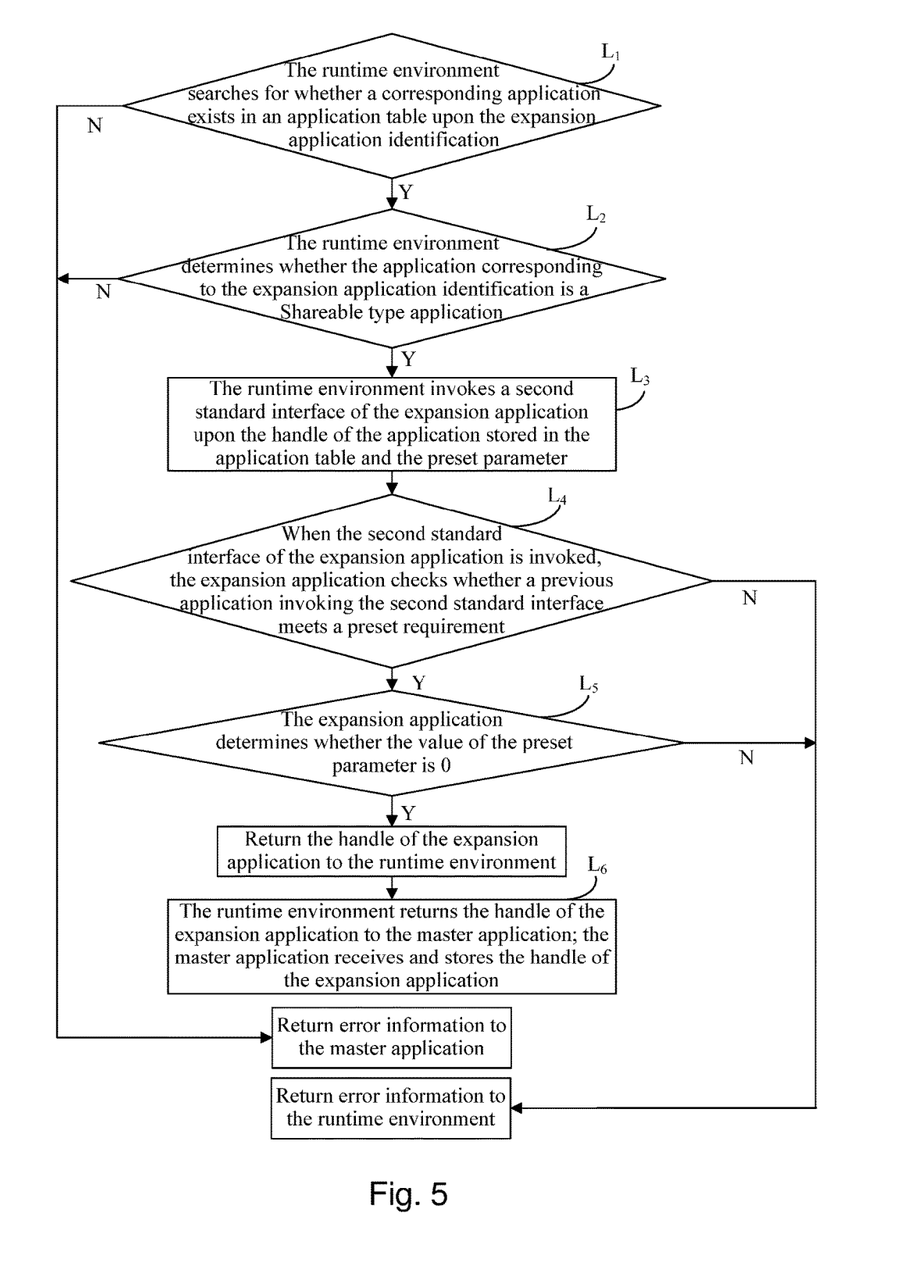
FIG. 5 presents a flow diagram of implementing obtaining handle of the expansion application provided by Embodiment 1 of the present invention.

In the present embodiment, obtaining and storing the handle of the expansion application specifically includes that the master application invokes a first standard interface via the expansion application identification and a preset parameter to obtain and store the handle of the expansion application; the first standard interface specifically is JCSystem-.getAppletShareableInterfaceOjbect(AID serverAID, byte parameter); as shown in FIG. 5, its implementing process includes following steps.

Step L1, the runtime environment searches for whether a corresponding application exists in an application table upon the expansion application identification (serverAID), if yes, execute Step L2, otherwise, return error information to the master application.

Step L2, the runtime environment determines whether the application corresponding to the expansion application identification is a Shareable type application, if yes, execute Step L3, otherwise, return error information to the master application.

Step L3, the runtime environment invokes a second standard interface of the expansion application upon the handle of the application stored in the application table and the preset parameter.

Step L4, when the second standard interface of the expansion application is invoked, the expansion application checks whether a previous application invoking the second standard interface meets a preset requirement, if yes, execute Step L5; otherwise, return error information to the runtime environment.

Step L5, the expansion application determines whether the value of the preset parameter (parameter) is 0, if yes, return the handle of the expansion application to the runtime environment and execute Step L6, otherwise, return error information to the runtime environment.

Step L6, The runtime environment returns the handle of the expansion application to the master application; the master application receives and stores the handle of the expansion application.

Step 115, the expansion application determines whether association is successful upon the information returned by the master application; if yes, execute Step 116; otherwise, invoke the communication interface and send error information out of the card; procedure is ended.

In the present embodiment, if the information returned by the master application is successful information, then the association is successful; if the information returned by the master application is error information, then the association is failed; after receiving the error information, the runtime environment will re-organize information and sends the re-organized information out of the card.

Step 116, the expansion application registers the state of the expansion interface.

Specifically, in the present embodiment, the state of the expansion interface is locked or active; when the state of the expansion interface is locked, the expansion interface is not available; when the state of the expansion interface is active, the expansion interface is available.

In the present embodiment, before Step 116, the method includes that the expansion application determines upon a data field of the registration command whether a corresponding interface is registered; if yes, invoke the communication interface to send error information out of the card, the procedure is ended; otherwise, execute Step 116.

In the present embodiment, the number of the expansion application is 01, 02; the state of the expansion interface is locked or active.

Step 117, the expansion application stores the state of the expansion interface in the buffer of the master application and determines whether storing is successful; if yes, invoke the communication interface to send information of successful registration out of the card, return to Step 100; otherwise, invoke the communication interface to send error information out of the card, the procedure is ended.

Correspondingly, in the present embodiment, Step 117 specifically includes that the expansion application invokes a third function of the master application, inputs the expansion interface number and the state of the expansion interface; after detecting that the third function is invoked, the master application checks whether an expansion point corresponding to the expansion interface number exists upon a parameter of the third function; if yes, modify the state of the expansion point upon the state of the expansion interface, invoke the communication interface to send information of successful registration out of the card, go back to Step 100; otherwise, return error information back to the runtime environment, end the procedure; the third function specifically is boolean setPatchPointSwitch(byte patchPoint, boolean ppSwitch).

In the present embodiment, the runtime environment captures exception after receiving error information; the procedure is ended after completing exception process.

In the present embodiment, returning error information represents that executing is error, which is a way for implementing error report.

In the present embodiment, the registering process of Step 116 can be implemented by selecting registering a default expansion interface; that is, the expansion application identification and the expansion interface number are in different commands, then Step 116 and Step 117 may be replaced with:

Step 116', the expansion application determines whether the registration command is legitimate; if yes, go back to Step 100; otherwise, invoke the communication interface to send error information out of the card, the procedure is ended.

Specifically, if the registration command is 00c00000 00, the registration command is legitimate.

If the expansion application determines that the type of the command is association command in Step 101, Step 117' is executed.

For example, the association command in the present embodiment is 00D00000 02 0102.

Step 117', the expansion application determines, upon a data field in the association command, whether a corresponding expansion interface is registered; if yes, invoke the communication interface and send error information out of the card, procedure is ended; otherwise, execute Step 118'.

In the present embodiment, the data field in the association command is the expansion interface number.

Step 118', the expansion application invokes the third function of the master application, inputs the expansion interface number and the state of the expansion interface; after detecting that the third function is invoked, the master application determines whether an expansion point corresponding to the expansion interface number exists; if yes, modify the state of the expansion point upon the input state of the expansion interface, return correct information back to the expansion application, go back to Step 100; otherwise, return error information back to the expansion application, the procedure is ended.

Specifically, if the expansion point corresponding to the expansion interface number exists, the state of the expansion point is set to be active state; correspondingly, modifying the state of the expansion point upon the state of the expansion interface specifically includes: setting the state of the expansion point to be active state. In the present embodiment, the expansion point and the expansion interface number are in relation of one-to-one correspondence.

Figure 2:
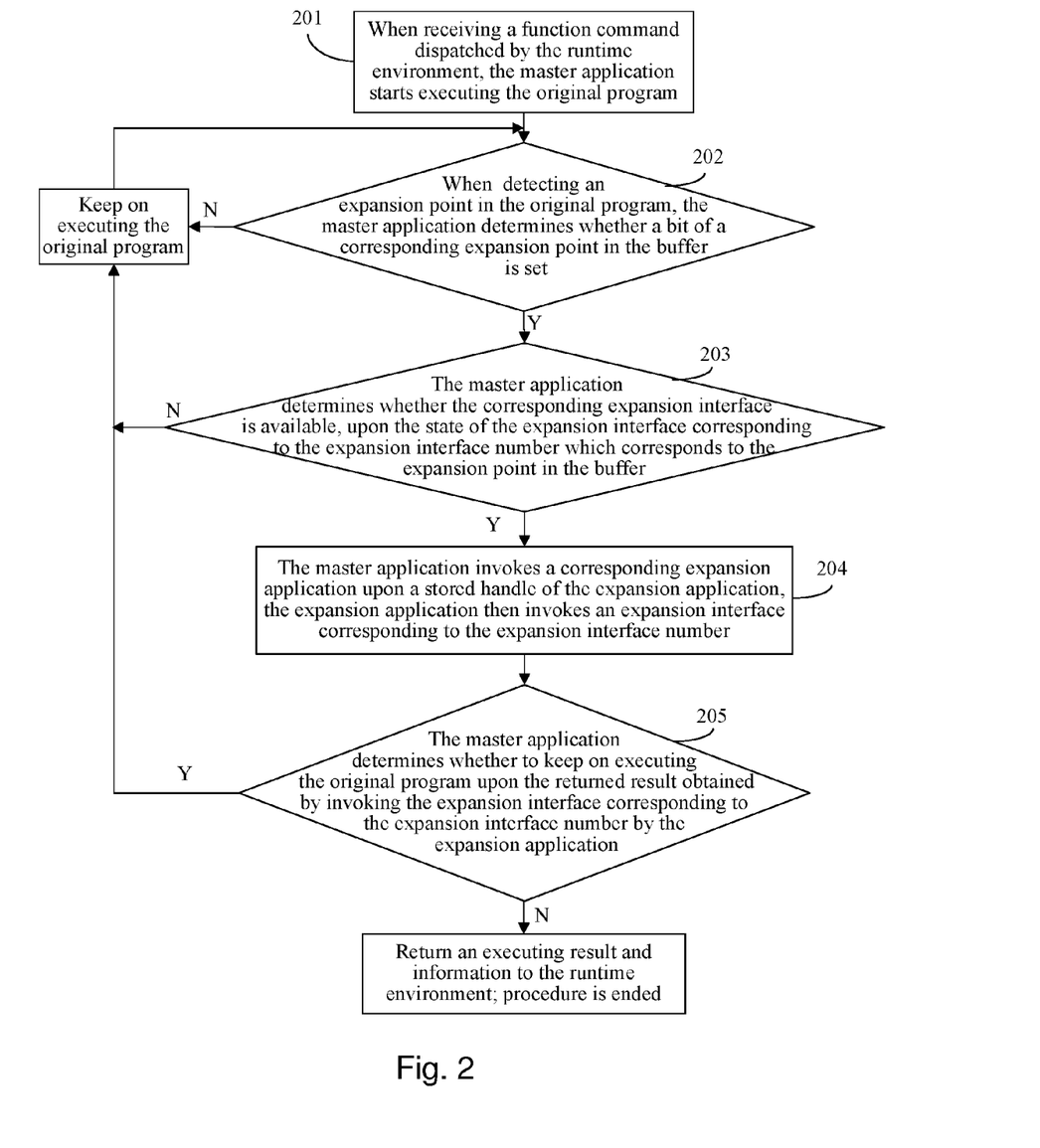

In this case, as shown in FIG. 2, invoking the expansion application includes following steps.

Step 201, when receiving a function command dispatched by the runtime environment, the master application starts executing the original program.

In the present embodiment, the original program includes specific program codes for implementing the function command.

Step 202, when the master application detects an expansion point in the original program, the master application determines whether a bit of a corresponding expansion point in the buffer is set, if yes, execute Step 203, otherwise, keep on executing the original program, go back to Step 202.

Step 203, the master application determines whether the expansion interface is available upon the state of the expansion interface corresponding to the expansion interface number which corresponds to the expansion point in the buffer; if yes, execute Step 204; otherwise, keep on executing the original program, go back to Step 202.

In the present embodiment, Step 203 specifically includes that the master application obtains the state of an expansion interface corresponding to a corresponding expansion interface number upon the detected expansion point, determines a type of the state of the expansion interface, for example, the type of being locked represents that the expansion application is not available, the type of being active represents that the expansion application is available.

Step 204, the master application invokes a corresponding expansion application upon a stored handle of the expansion application, the expansion application then invokes an expansion interface corresponding to the expansion interface number.

Specifically, in the present embodiment, between Step 203 and Step 204, the method includes that the master application determines whether the expansion application corresponding to the expansion application identification is an application of Sharable type, if yes, execute Step 204, otherwise, keep on executing the original program, go back to Step 201.

Step 205, the master application determines whether to keep on executing the original program, upon the returned result obtained by invoking the expansion interface corresponding to the expansion interface number by the expansion application, if yes, keep on executing the original program, go back to Step 202, otherwise, return an executing result and information to the runtime environment; the procedure is ended.

Specifically, in the present embodiment, if the expansion application returns 0, the master application does not need to keep on executing the original program, otherwise, the master application keeps on executing the original program.

Figure 3:
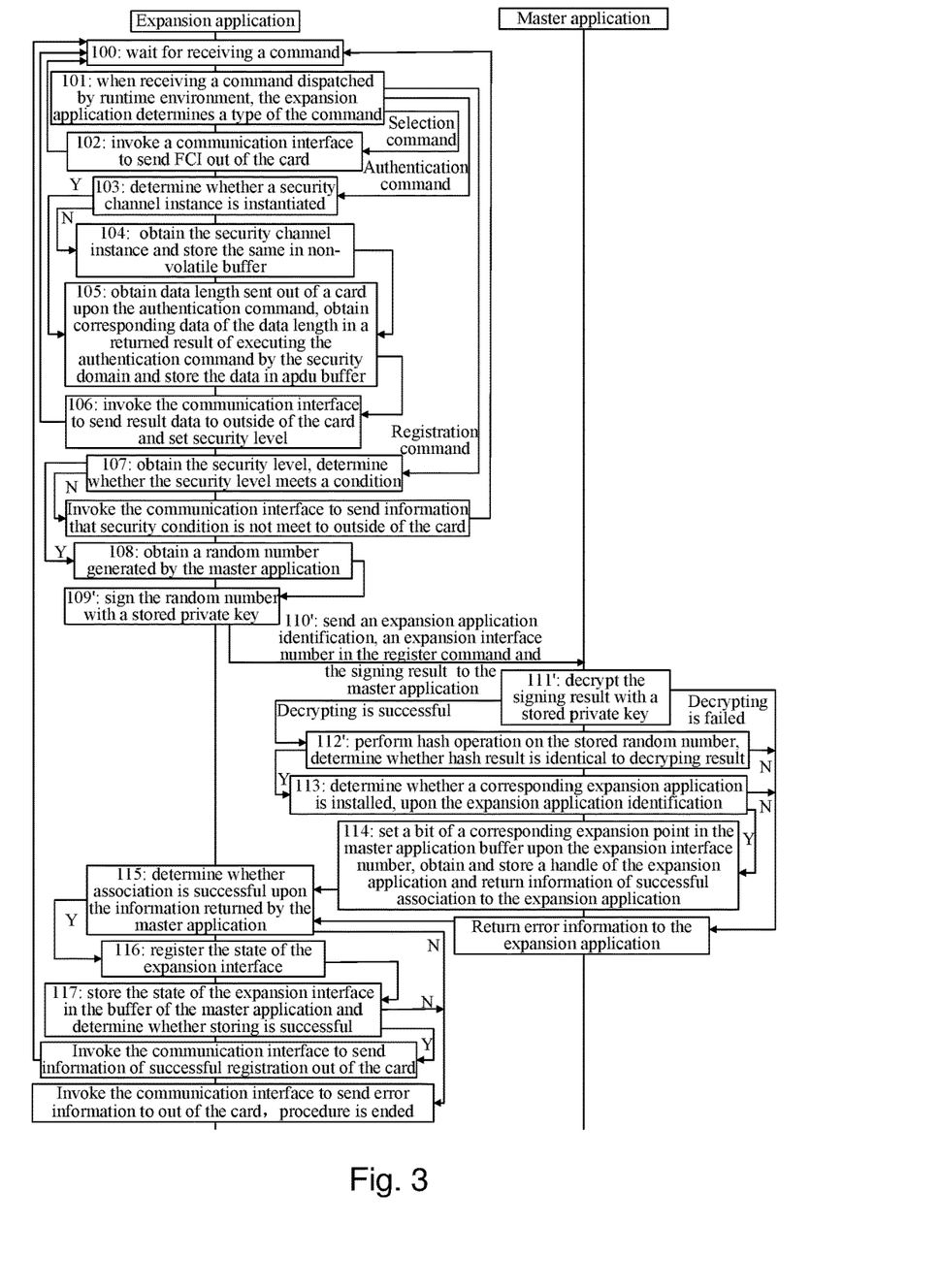
FIG. 3 presents another flow diagram of registering an expansion application in the implementing method for JavaCard application function expansion provided by Embodiment 1 of the present invention.

In the present embodiment, as shown by FIG. 3, Step 109 to Step 112 can be replaced with:

Step 109': the expansion application signs the random number with a stored private key.

In the present embodiment, the expansion application has set a type of the key at the time of personalizing; preferably, the key in the present embodiment is an asymmetric key.

Step 110': the expansion application sends the expansion application identification and the expansion interface number in the registration command, and a signing result to the master application.

Specifically, in the present embodiment, the expansion application takes the expansion application identification, the expansion interface number and the signing result as parameters to invoke a second function, which is extendInstall( ), of the master application; the second function is for obtaining a registration expansion application interface; the expansion application verifies the signing result by invoking the second function of the master application.

Step 111', the master application decrypts the signing result with a stored public key, if decrypting is successful, execute Step 112', if decrypting is failed, return error information to the expansion application, execute Step 115.

In the present embodiment, the public key stored in the master application is corresponding to the private key in the expansion application.

Step 112', the master application performs hash operation on the stored random number, determines whether a hash result is identical to a decrypting result, if yes, execute Step 113, otherwise, return error information to the expansion application, execute Step 115.

In the present embodiment, processing the random number specifically is illustrated by an example of encrypting and signing the random number.

Figure 4:
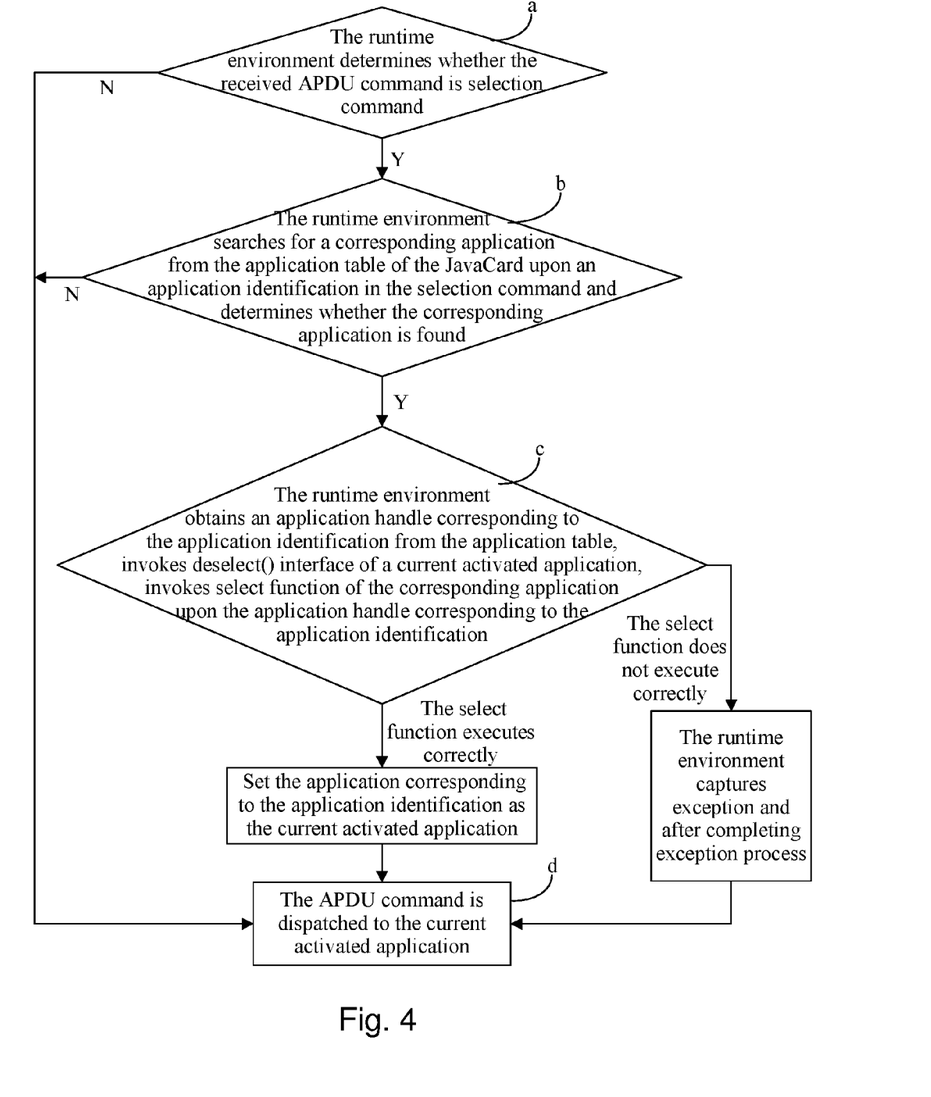
FIG. 4 presents a flow diagram of implementing command dispatching and selecting process provided by Embodiment 1 of the present invention.

In the present embodiment, before Step 100, the runtime environment requires to perform corresponding process when receiving an APDU command; as shown in FIG. 4, corresponding process includes following steps.

Step a, the runtime environment determines whether the received APDU command is a selection command, if yes, execute Step b, otherwise, execute Step d.

Step b, the runtime environment searches for a corresponding application from the application table of the JavaCard upon an application identification in the selection command and determines whether the corresponding application is found, if yes, execute Step c, otherwise, execute Step d.

Specifically, the runtime environment checks whether the following condition is met, e.g. CLS=0x00, INS=0xA4, P1=0x04, P2=0x00, Lc=length(application identification), and 5≤lc≤16, if the condition is not met, the corresponding application is not found, otherwise, the corresponding application is found.

Step c, the runtime environment obtains an application handle corresponding to the application identification from the application table, invokes deselect( ) interface of a current activated application, invokes a select function of the corresponding application upon the application handle corresponding to the application identification; if the select function executes correctly, set the application corresponding to the application identification as the current activated application and Step d is executed; if the select function does not execute correctly, the runtime environment captures exception and Step d is executed after completing exception process.

In the present embodiment, deselect( ) is for canceling the current activated application in the runtime environment; select function is for selecting the current activated application in the runtime environment; if the application corresponding to the application identification is the master application, the current activated application is the master application; if the application corresponding to AID is the expansion application, the current activated application is the expansion application; for example, AID is D0000000000601, the current activated application is the master application; if AID is D000000000060101, the current activated application is the expansion application; the master application and/or the expansion application start(s) working after being activated.

Step d, the APDU command is dispatched to the current activated application.

The method of the present embodiment is also applicable to applications such as ISD type, i.e. an expansion point is set in the application like ISD type; after masking or downloading COS, an expansion application can further be downloaded, which will not affect working of other applications.

Those skilled in the art should understand that part or all of steps described in above embodiments can be completed by a program instructing related hardware; the above described program can be stored in computer readable storage media; when the program is executed, steps in above embodiment of the method is performed; the above storage media includes ROM, RAM, a magnetic disk or a compact disc, etc., which can store program codes.

Finally, it should be noted that the above embodiments are only intended to describe the technical solution of the present invention, but not intended to limit the present invention. Though the present invention is described in detail with reference to the above embodiments, those skilled in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

The invention claimed is:

1. An implementing method for JavaCard application function expansion, comprising a registering process and an invoking process on a JavaCard, an expansion application and a master application on the JavaCard starting working after being activated, wherein the registering process comprises:

Step S1, obtaining, by the expansion application, a random number generated by the master application when the expansion application receives a registration command dispatched by runtime environment on the JavaCard;

Step S2, processing, by the expansion application, the random number and sending a processing result, and an expansion application identification and an expansion interface number in the registration command to the master application;

Step S3, verifying, by the master application, the received processing result based upon the generated random number, wherein if verification of the processing result is successful, executing Step S4, otherwise, reporting error and ending the registering process;

Step S4, determining, by the master application, whether a expansion application corresponding to expansion application identification is installed based upon the received expansion application identification, wherein if the master application determines that the expansion application corresponding to expansion application identification is installed, executing Step S5, otherwise, reporting error and ending the registering process;

Step S5, setting, by the master application, a bit of an expansion point corresponding to the expansion interface number in a buffer of the master application; obtaining and storing, by the master application, a handle of the expansion application and returning information of successful association to the expansion application;

Step S6, registering, by the expansion application, a state of its expansion interface and storing the state of the expansion interface in the buffer of the master application;

the invoking process comprises:

Step S7, starting, by the master application, running of an original program when the master application receives a function command dispatched by the runtime environment;

Step S8, determining, by the master application, whether the bit of the expansion point in the buffer is set, if yes, executing Step S9, otherwise, keeping on executing the original program, and going back to Step S8;

Step S9, determining, by the master application, whether the expansion interface corresponding to the expansion interface number is available based upon the state of the expansion interface corresponding to the expansion interface number which corresponds to the expansion point in the buffer, if yes, executing Step S10; otherwise, keeping on executing the original program, and going back to Step S8;

Step S10, invoking, by the master application, the expansion application based upon the stored handle of the expansion application; invoking, by the expansion application, the expansion interface corresponding to the expansion interface number;

Step S11, determining, by the master application, whether to keep on executing the original program, based upon a returned result obtained by invoking the expansion interface corresponding to the expansion interface number by the expansion application, if yes, keeping on executing the original program and going back to Step S8, otherwise, returning executing result and information back to the runtime environment, and ending the invoking process.

2. The method of claim 1, wherein before Step S1, the method further comprises: when the expansion application receives an authentication command dispatched by the runtime environment, executing Step A1 to Step A4; Step A1, determining, by the expansion application, whether a security channel instance is instantiated, if yes, executing Step A3, otherwise, executing Step A2; Step A2, obtaining, by the expansion application, the security channel instance and storing the security channel instance in non-volatile buffer, and executing Step A3; Step A3, obtaining, by the expansion application, based upon the authentication command, a data length of data which is to be sent out of a card the JavaCard; obtaining data corresponding to the data length which is returned as a result of executing the authentication command by a security domain and storing the data in an apdu buffer; Step A4, sending, by the expansion application, the data out of the JavaCard by invoking a communication interface, and setting a security level based on the authentication command being a first authentication command or a second authentication command.

3. The method of claim 2, wherein Step A3 further comprises:
Step A3-1, determining, by the expansion application, a type of the authentication command, executing Step A3-2 if the type is a first authentication command, and executing Step A3-3 if the type is a second authentication command;
Step A3-2, obtaining, by the expansion application, the data length of data which is to be sent out of the card the JavaCard obtaining, based upon the data length, data of corresponding data length which is returned as a result of executing the first authentication command by the security domain and storing the data in the apdu buffer, and executing Step A4;
Step A3-3, obtaining, by the expansion application, the data length of data required to be sent out of the JavaCard, and executing Step A4, wherein the data length is 00.

4. The method of claim 3, wherein
if the authentication command is the first authentication command, Step A4 comprises: invoking, by the expansion application, the communication interface to send the data in the apdu buffer out of the JavaCard, setting a value of the security level as 00;
if the authentication command is the second authentication command, Step A4 comprises: invoking, by the expansion application, the communication interface to send correct information out of the JavaCard, setting the value of the security level as non-00.

5. The method of claim 2, wherein, before obtaining, by the master application, the generated random number in Step S1, the method further comprises:
obtaining, by the expansion application, the security level and determining whether the security level meets a condition, if yes, obtaining the random number generated by the master application, otherwise, invoking the communication interface to send information that security condition is not met out of the JavaCard.

6. The method of claim 5, wherein determining whether the security level meets a condition specifically includes:
obtaining a value of the security level by invoking a first interface function, determining whether the obtained value is 00, if yes, the security level does not meet the condition, otherwise, the security level meets the condition.

7. The method of claim 1, wherein before Step S1, the method further comprises:
Step B, when the expansion application receives a selection command, invoking the communication interface to send file controlling information out of the JavaCard.

8. The method of claim 7, wherein before Step B the method further comprises:
executing Step P1 when the runtime environment receives an APDU command;
Step P1, determining, by the runtime environment, whether the received APDU command is the selection command, if yes, executing Step P2, otherwise, executing Step P4;
Step P2, searching for, by the runtime environment, a corresponding application in an application table of the JavaCard based upon an application identification in the selection command, determining whether the corresponding application is found, if yes, executing Step P3, otherwise, executing Step P4;
Step P3, obtaining, by the runtime environment, an application handle corresponding to the application identification from the found application, invoking a deselect( )interface of a current activated application, invoking a select function of the corresponding application based upon the application handle corresponding to the application identification; if the select function is executed correctly, setting the application corresponding to the application identification as the current activated application, executing Step P4; if the select function is not executed correctly, capturing, by the runtime environment, exception, executing Step P4 after completing exception process;
Step P4, dispatching, by the runtime environment, the received APDU command to the current activated application.

9. The method of claim 1, wherein
Step S2 comprises: encrypting, by the expansion application, the obtained random number with a stored key, sending an encrypting result, and the expansion application identification and the expansion interface number in the registration command to the master application;

Step S3 comprises: decrypting, by the master application, the received encrypting result with the stored key, if the decrypting is successful, determining whether a random number obtained by decrypting is identical to the generated random number, if yes, executing Step S4, otherwise, returning error information to the expansion application; if the decrypting is failed, returning error information to the expansion application.

10. The method of claim 1, wherein
Step S2 comprises: signing, by the expansion application, the obtained random number with a stored private key, sending a signing result, and the expansion application identification and the expansion interface number in the registration command to the master application;
Step S3 comprises: decrypting, by the master application, the received signing result with a stored public key, if the decrypting is successful, performing hash operation on the generated random number, determining whether a hash result is identical to a decrypting result, if yes, executing Step S4, otherwise, returning error information; if the decrypting is failed, returning error information to the expansion application.

11. The method of claim 9, wherein between Step S5 and Step S6, the method further comprises: determining, by the expansion application, whether association is successful based upon information returned by the master application, if yes, executing Step S6, otherwise, invoking a communication interface of the JavaCard to send error information out of the JavaCard, and ending the registering process.

12. The method of claim 1, wherein after Step S6, the method comprises: determining, by the expansion application, whether storing of the state of the expansion interface is successful, if yes, invoking a communication interface of the JavaCard to send information indicating successful registration out of the JavaCard, and going back to Step S1, otherwise, capturing, by the runtime environment, an exception, and ending the registering process after completing an exception process.

13. The method of claim 1, wherein, before Step S6, the method further comprises:
Step S6-1, determining, by the expansion application, whether the corresponding expansion interface is registered based upon a data field in the registration command, if yes, invoking the communication interface to send error information out of the JavaCard and ending the registering process, otherwise, executing Step S6.

14. The method of claim 1, wherein Step S6 comprises: invoking, by the expansion application, a third function of the master application, inputting the expansion interface number and the state of the expansion interface;
after detecting that the third function is invoked, checking, by the master application, whether an expansion point corresponding to the expansion interface number exists, if yes, modifying a state of the expansion point based upon the state of the expansion interface, returning correct information back to the expansion application and going back to Step S1, otherwise, returning error information back to the expansion application and ending the registering process.

15. The method of claim 1, wherein Step S6 is replaced with a step of determining, by the expansion application, whether the registration command is legitimate, if yes, going back to Step S1, otherwise, invoking the communication interface to send error information out of the JavaCard and ending the registering process;

the method further comprises: executing Step D1 when the expansion application receives an association command;
Step D1, determining, by the expansion application, whether a corresponding expansion interface is registered based upon a data field in the association command, if yes, invoking the communication interface to send error information out of the JavaCard and ending the registering process, otherwise, executing Step D2;
Step D2, invoking, by the expansion application, a third function of the master application, inputting the expansion interface number and the state of the expansion interface;
after detecting, by the master application, that the third function is invoked, checking whether an expansion point corresponding to the expansion interface number exists, if yes, modifying a state of the expansion point based upon the state of the expansion interface, returning correct information back to the expansion application, otherwise, returning error information back to the expansion application and ending the registering process.

16. The method of claim 14, wherein modifying the state of the expansion point based upon the state of the expansion interface specifically comprises: setting the state of the expansion point to be an active state;
Step S9 specifically comprises: determining, by the master application, whether the state of the expansion point is the active state, if yes, the corresponding expansion interface is available, otherwise, the corresponding expansion interface is not available.

17. The method of claim 1, wherein obtaining and storing the handle of the expansion application in Step S5 comprises: obtaining and storing, by the master application, the handle of the expansion application by invoking a first standard interface via the expansion application identification and a preset parameter.

18. The method of claim 17, wherein obtaining and storing, by the master application, the handle of the expansion application by invoking a first standard interface specifically comprises:
Step L1, searching for, by the runtime environment, whether there is a corresponding application in an application table based upon the expansion application identification, if yes, executing Step L2; otherwise, returning error information to the master application;
Step L2, determining, by the runtime environment, whether the application corresponding to the expansion application identification is a Shareable type application, if yes, executing Step L3; otherwise, returning error information to the master application;
Step L3, invoking, by the runtime environment, a second standard interface of the expansion application based upon the application handle stored in the application table and the preset parameter;
Step L4, when the second standard interface of the expansion application is invoked, checking, by the expansion application, whether a previous application invoking the second standard interface meets a preset requirement, if yes, executing Step L5, otherwise, returning error information to the runtime environment;
Step L5, determining, by the expansion application, whether a value of the preset parameter is 0, if yes, returning the handle of the expansion application to the runtime environment and executing Step L6, otherwise, returning error information to the runtime environment;

Step L6, returning, by the runtime environment, the handle of the expansion application to the master application; receiving and storing, by the master application, the handle of the expansion application.

19. The method of claim 18, wherein between Step S9 and Step S10, the method comprises:

determining, by the master application, whether the expansion application corresponding to the expansion application identification is the Shareable type application, if yes, executing Step S10, otherwise, keeping on executing the original program and going back to Step S7.

* * * * *